(12) United States Patent
Shaikh et al.

(10) Patent No.: US 10,884,713 B2
(45) Date of Patent: Jan. 5, 2021

(54) TRANSFORMATIONS OF A USER-INTERFACE MODALITY OF AN APPLICATION

(71) Applicant: INTERNATIONAL BUSINESS MACHINES CORPORATION, Armonk, NY (US)

(72) Inventors: Samiulla Zakir Hussain Shaikh, Bangalore (IN); Vijay Ekambaram, Chennai (IN); Padmanabha Venkatagiri Seshadri, Mysore (IN); Shinoj Zacharias, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/285,101

(22) Filed: Feb. 25, 2019

(65) Prior Publication Data

US 2020/0272432 A1 Aug. 27, 2020

(51) Int. Cl.
*G06F 8/35* (2018.01)
*G06N 20/00* (2019.01)
(Continued)

(52) U.S. Cl.
CPC ............... *G06F 8/35* (2013.01); *G06F 8/38* (2013.01); *G06F 8/433* (2013.01); *G06F 8/436* (2013.01);
(Continued)

(58) Field of Classification Search
None
See application file for complete search history.

(56) References Cited

U.S. PATENT DOCUMENTS 5,583,983 A   12/1996  Schmitter
5,860,008 A    1/1999  Bradley
(Continued)

FOREIGN PATENT DOCUMENTS

CN         101567065 A    10/2009

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.
(Continued)

*Primary Examiner* — Qing Chen
(74) *Attorney, Agent, or Firm* — Cuenot, Forsythe & Kim, LLC

(57) ABSTRACT

Transforming a user-interface modality of a software application can include identifying a first workflow segment corresponding to a UI modality of an application developed to run on a predetermined data processing platform and selecting one or more other workflow segments to transform the UI modality of the application. Each other workflow segment performs on a different data processing platform a function comparable to a function performable by the first workflow segment. The one or more other workflow segments can be selected from a multi-member set of alternative workflow segments that are semantically similar to the first workflow segment. The selecting can be based on classifying the first workflow segment with a classification model trained using machine learning to map workflow segments and corresponding UI modalities to different processing platforms.

20 Claims, 15 Drawing Sheets

(51) Int. Cl.
*G06F 8/76* (2018.01)
*G06F 8/38* (2018.01)
*G06F 8/41* (2018.01)
*G06K 9/62* (2006.01)

(52) U.S. Cl.
CPC ............. *G06F 8/76* (2013.01); *G06K 9/6256* (2013.01); *G06N 20/00* (2019.01)

(56) References Cited

U.S. PATENT DOCUMENTS

| | | | |
|---|---|---|---|
| 6,895,409 | B2 | 5/2005 | Uluakar et al. |
| 7,337,436 | B2 | 2/2008 | Chu et al. |
| 7,907,966 | B1 | 3/2011 | Mammen |
| 9,430,207 | B1 | 8/2016 | Bandhole et al. |
| 2008/0146245 | A1 | 6/2008 | Appaji |
| 2009/0064202 | A1 | 3/2009 | Lee et al. |
| 2010/0097331 | A1 | 4/2010 | Wu |
| 2013/0091170 | A1* | 4/2013 | Zhang ............. G06Q 10/06313 707/783 |
| 2014/0025426 | A1* | 1/2014 | Doehring ............... G06Q 10/06 705/7.27 |
| 2014/0282398 | A1 | 9/2014 | Podolyak et al. |
| 2014/0310611 | A1 | 10/2014 | Lewin et al. |
| 2016/0085430 | A1* | 3/2016 | Moran ................ G06F 3/04847 715/765 |
| 2016/0306506 | A1 | 10/2016 | Curtis et al. |

OTHER PUBLICATIONS

König, W.A. et al., "Interactive design of multimodal user interfaces," Journal on Multimodal User Interfaces, Apr. 1, 2010, vol. 3, No. 3, pp. 197-213.

Park, K. et al., "Model-Based Approach for Engineering Adaptive User Interface Requirements," In Requirements Engineering in the Big Data Era (pp. 18-32). Springer, Berlin, Heidelberg, 2015.

Blei, D.M., "Probabilistic Topic Models," Communications of the ACM, Apr. 2012, vol. 55, No. 4, pp. 77-84.

Blei, D.M. et al., "Latent dirichlet allocation," Journal of Machine Learning Research 3, Jan. 3, 2003, pp. 993-1022.

* cited by examiner

TRANSFORMATIONS OF A USER-INTERFACE MODALITY OF AN APPLICATION

BACKGROUND

The present disclosure relates to data processing systems, and more particularly, to data processing systems for creating software-based applications.

Application software comprises processor-executable code for performing coordinated tasks or activities using a computer or other device that is endowed with data processing capabilities. Other devices include smartphones, tablets, smartwatches, smart glasses, and various other types of data processing platforms. Application software executable on different processing platforms can be created using a variety of software development tools. Some application software development tools comprise discrete computer programs that execute separately from one another. Other application software development tools provide an expanded set of programming functions within a single, larger program. An example of the latter type of software development tool is an integrated development environment (IDE).

SUMMARY

A method can include identifying, with a data processing system, a first workflow segment corresponding to a user-interface (UI) modality of an application, the application developed to run on a predetermined data processing platform. The method also can include selecting, by the data processing system, one or more other workflow segments to transform the UI modality of the application, each other workflow segment performing on a different data processing platform a function comparable to a function performable by the first workflow segment. The one or more other workflow segments can be selected from a multi-member set of alternative workflow segments that are semantically similar to the first workflow segment. The selecting can be based on classifying the first workflow segment with a classification model trained using machine learning to map workflow segments and corresponding UI modalities to different processing platforms.

A system includes computer hardware having at least one processor programmed to initiate executable operations. The executable operations can include identifying a first workflow segment corresponding to a UI modality of an application, the application developed to run on a predetermined data processing platform. The executable operations also can include selecting one or more other workflow segments to transform the UI modality of the application, each other workflow segment performing on a different data processing platform a function comparable to a function performable by the first workflow segment. The one or more other workflow segments can be selected from a multi-member set of alternative workflow segments that are semantically similar to the first workflow segment. The selecting can be based on classifying the first workflow segment with a classification model trained using machine learning to map workflow segments and corresponding UI modalities to different processing platforms.

A computer program product includes a computer-readable storage medium having program code stored thereon, the program code executable by a computer to initiate operations. The operations can include identifying a first workflow segment corresponding to a UI modality of an application, the application developed to run on a predetermined data processing platform. The operations also can include selecting one or more other workflow segments to transform the UI modality of the application, each other workflow segment performing on a different data processing platform a function comparable to a function performable by the first workflow segment. The one or more other workflow segments can be selected from a multi-member set of alternative workflow segments that are semantically similar to the first workflow segment. The selecting can be based on classifying the first workflow segment with a classification model trained using machine learning to map workflow segments and corresponding UI modalities to different processing platforms.

DETAILED DESCRIPTION

Figure 1:
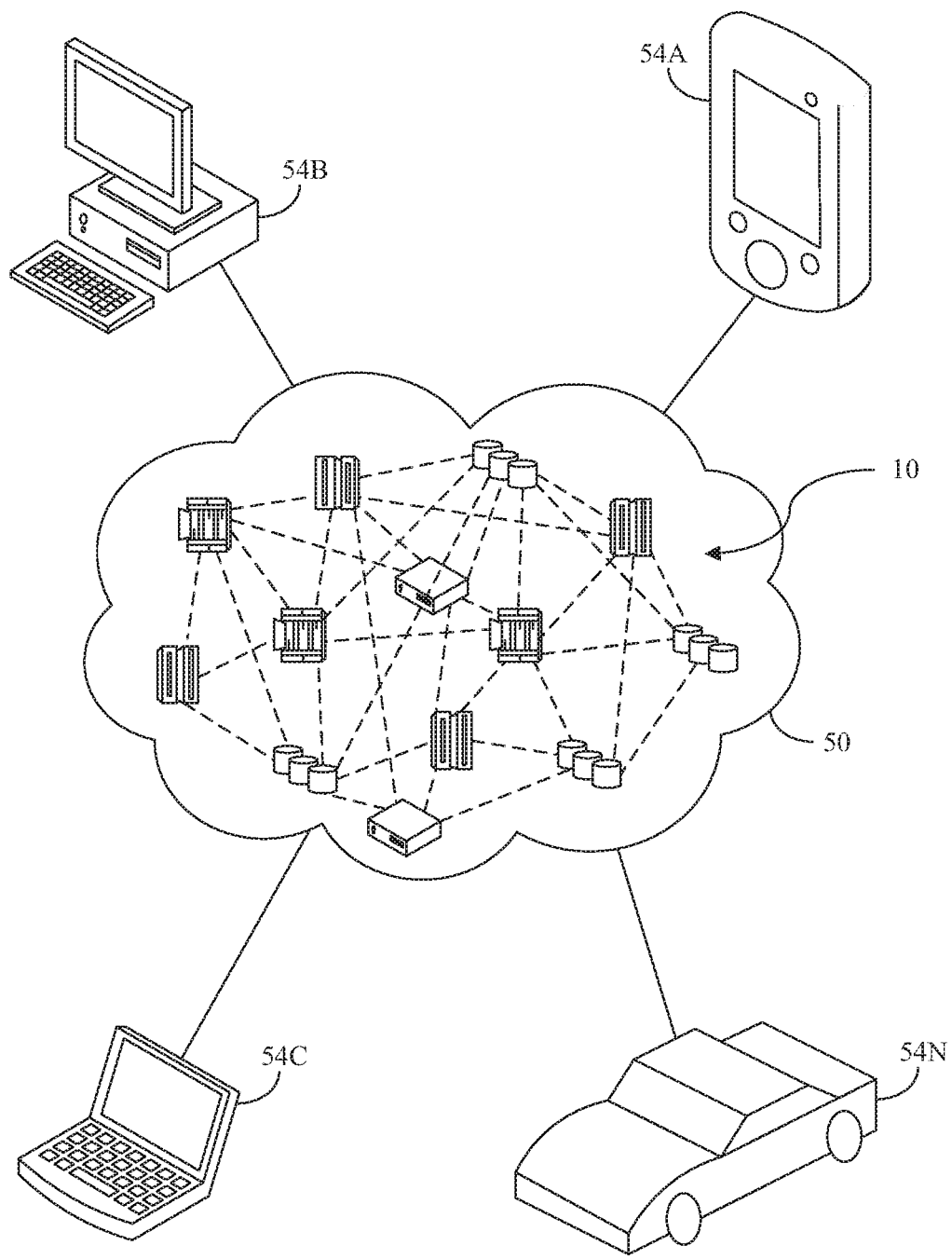
FIG. 1 depicts a cloud computing environment according to an embodiment of the present invention.

The present disclosure relates to data processing systems for creating software-based applications and for porting different versions of such applications to different data processing platforms.

An extensive range of software applications exists for virtually all types of computers. Moreover, rapid enhancements in computing power and memory have transformed mobile phones from mere communication devices to platforms for executing ever-more sophisticated software applications (or "apps"). In addition to smartphones, other mobile devices such as smartwatches and smart glasses, for example, also serve as data processing platforms for software-based applications. Running on these various data processing platforms is a seemingly ever-expanding supply of software applications. Among these are applications for messaging and file sharing, gaming, image and video processing, health and fitness monitoring, news retrieval, document handling, remote banking, on-line purchasing, order tracking, and a host of other types of applications.

Porting an application that runs on one platform to another platform typically requires conversion of the application's underlying code. This is especially so with respect to the different user interface (UI) modalities with which a user interacts with the application using different devices. Different devices can also rely on different operating systems to manage the devices' processing resources. Thus, an application developer typically must create separate versions of an application to perform the same or similar functions on different data processing platforms. For example, an application developer may need to create the application using different semantics and syntax, sometimes using entirely different languages (e.g., C++, Objective C, Java, JavaScript, .Net®), to port the same application onto different platforms.

The methods, systems, and computer program products disclosed herein automatically determine code changes to transform UI modalities of a software application, thereby allowing the application to be ported to data processing platforms different than the platform the application was initially designed to run on. Moreover, the transformations can be effected even as an application is still in the development phase for running on a single platform. The modality transformations are generated based on a classification model constructed using machine learning techniques described herein. The classification model learns to recognize patterns in changes made in porting different types of applications to different platforms and to map different application workflow segments and corresponding UI modalities to different data processing platforms. Based on the type of an application and the functions or procedures the application performs, the model automatically determines alternative workflows for creating different versions of the application for performing the same or comparable functions using different UI modalities on one or more different data processing platforms. Because the model is trained using data drawn from various applications across various application domains, the model can discover the specific UI modalities most likely to offer the best performance and greatest appeal to application users when the applications run on different data processing platforms.

Using the methods, systems, and computer program products disclosed herein, a developer need only develop one version of an application to run on a specific data processing platform using platform-specific UI modalities. The disclosed methods, systems, and computer program products can determine alternative workflows for creating different versions of the application for performing comparable functions using different UI modalities, providing corresponding code collected from examples of other applications. It is not only the productivity of an application developer that is enhanced by the disclosed methods, systems, and computer program products, however. The performance of any device that runs an IDE or other software, as typically used by an application developer, can also be enhanced by the methods, systems, and computer program products disclosed. Rather than each developer, on each developer's individual device, storing multiple versions of earlier-developed, platform-specific applications, each developer can instead access a single source. Rather than each developer attempting to gain insight by comparing code changes made in porting previous applications to different platforms, each can access the single source, which automatically identifies code changes that should be made to create multiple, platform-specific versions of an application based on a single, in-development version of a new application. In one embodiment, the single source can be a server, such as a cloud-based server, that communicates with multiple IDEs or other software executing on multiple developers' devices.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
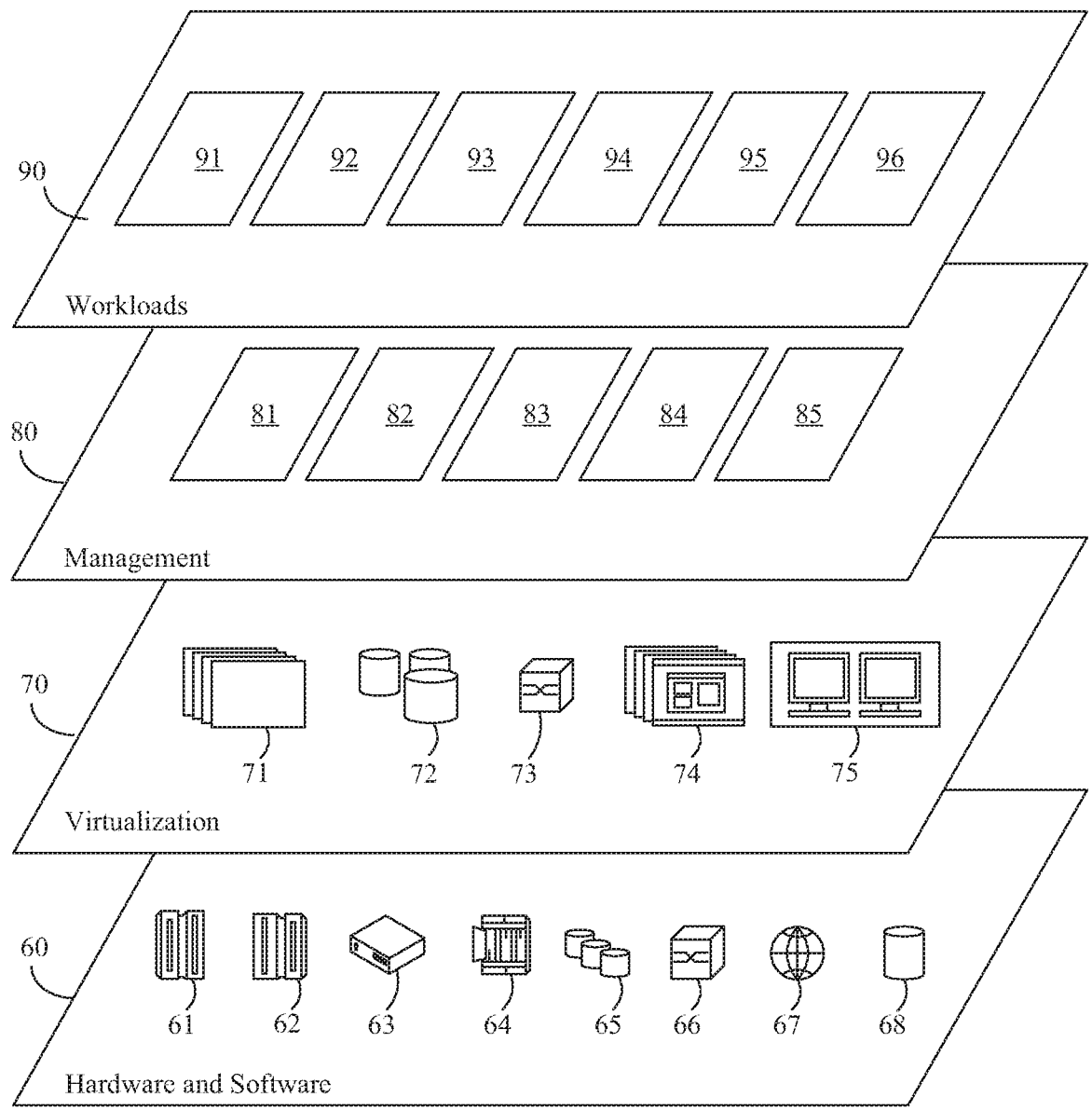
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system 96 for transforming platform-specific UI modalities of an application.

In one or more embodiments, system 96 uses machine learning (e.g., deep learning) to build a classification model that recognizes patterns as workflow segments and corresponding UI modalities of a software application are modified to create different platform-specific versions of the application. As defined herein, "workflow" means the functions and routines implemented in processor-executable code for performing application tasks (e.g., login, book a reservation, make on-line purchases). A "workflow segment" refers to a specific function or procedure performed as part a workflow. With respect to workflow segments that facilitate user interaction with the application, the workflow segments correspond to one or more UI components. "UI components," as defined herein, refer to hardware and software objects (e.g., keyboard, touch-screen, textboxes, voice recognition) through which a user interacts with the application and which, in the aggregate, constitute a UI modality of an application. The workflow segments and corresponding UI components of an application that run on one data processing platform can differ with respect to a different version of the same application that runs on a different data processing platform. As defined herein, "data processing platform," refers to system software and hardware, including different device form-factors (e.g., computer, laptop, tablet, smartphone, smartwatch, smart glasses, and the like), as well as different operating systems. As defined herein, to "run" means to execute processor-executable code on one or more processors of a computer or other data processing platform. Accordingly, an application "runs" when executed by a computer or other data processing platform and is "running" while executing a computer or other data processing platform.

The system can use topic modeling techniques (e.g., linear Dirichlet allocation) to cluster workflow segments into distinct clusters or groupings based on the segments' semantics. As defined herein, "semantics" refer to high-level descriptions of functions and procedures implemented in processor-executable code and performed by specific workflow segments (e.g., login, on-line purchasing, reservation booking). The system clusters workflow segments that are semantically similar (e.g., workflow segment related to entering password in a mobile device is clustered with the workflow related to entering password in a smartwatch). Thus, as defined herein, a workflow segment is "semantically similar" to another workflow segment if the former segment performs a function that is the same or comparable to the latter segment, albeit on a different data processing platform.

In one embodiment, the system extracts, for each distinct cluster, the top-K workflow segments (K is any integer) for each platform based on frequencies of occurrence across different applications. Under the reasonable assumption that developers choose UI modalities that most appeal to users (e.g., "user friendly" input and output modes), the system can discover, based on the frequencies with which specific workflow segments are used with specific types of applications, those UI modalities most appealing to application users.

The system accesses multiple applications and obtains the source code of each. The system, as described below, can decompile an application's object code (in machine and/or assembly code) to obtain the source code. The source code can be owned by the user (e.g., the user is a vendor of applications that, in different versions, run on different platforms), or the code can be obtained by permission (e.g., under license agreement with the developer or owner of the application). Indeed, some popular platform vendors also o□er an application developer middleware support that includes granting access to di□erent platform resources, such as the underlying operating system, middleware components, program libraries and tools. Other source code is non-proprietary code, such as code for programs executing on a Linux-based open-source system.

Based on the source code, the system determines the semantics of each application's workflow and corresponding workflow segments. UI modalities corresponding to workflow segments that facilitate users' interactions with an application can be obtained by the system from each application's accessibility text. "Accessibility text," as the term is widely used, refers to text that is used by screen-reader accessibility software, such as TalkBack® on Android®, VoiceOver on iOS, and JAWS on desktop. (The Federal Information Technology Accessibility Initiative mandates that individuals with disabilities have equal access to information technology, and accessibility text helps provide such access.) Accessibility text is typically available with applications implemented in accordance with high-standard coding guidelines and can provide a rendering of application components (e.g., graphical user interface widgets for a smartwatch, smart glasses, and the like). Thus, this text component also can be leveraged to extract common semantics. In the present context, an understanding of the workflow semantics is enhanced by accessibility text.

The semantics of the workflow segments along with application type or domain (e.g., messaging application, news retrieval application, e-commerce application) jointly provide inputs for training the classification model. The application domain can affect the classification used in identifying UI modality transformations, as described more fully below.

Different UI modalities correspond to different workflow segments. Thus, in porting an application from a platform utilizing one UI modality to a different platform using a different UI modality, changes are made to application workflow segments. Specifically, to transform an application UI modality, a workflow segment is substituted for another, both performing a comparable function albeit on different data processing platforms. Examples of such changes from prior application developments in which workflow segments were changed in porting an application from one data processing platform to another are supplied to the system as training examples. The system uses the training examples to train the classification model, using machine learning (e.g., deep learning), to recognize patterns about various changes in different versions of the same application for different platforms.

The classification model maps workflow segments and corresponding UI modalities to different processing platforms based on application domains and tracked substitutions of semantically similar workflow segments for transforming UI modalities of an application from one data processing platform to one or more other platforms. The system can use the learned patterns to identify and recommend to an application developer alternative workflow segments for different platform-specific versions of an application in development.

The system, in one embodiment, runs on a server such as a cloud-based server. The server is accessible to application developers that develop applications using IDEs or other application development software. The system, running on the server, communicates with an IDE or other application software via a communication channel. In some embodiments, the system interacts with the IDE or other application software by recommending to a developer one or more workflow segment substitutions to transform a version of an application that runs using one UI modality on one platform to a version that runs using a different UI modality on a different platform. In some embodiments, the system automatically substitutes code corresponding to one workflow segment for another workflow segment in response to a user (developer) command issued to the system via the communication channel. In other embodiments, the system is implemented as a software component such as a plugin that adds the described capabilities to an existing IDE and that communicates with one or more remote servers for collecting input data to feed to the system.

Figure 3:
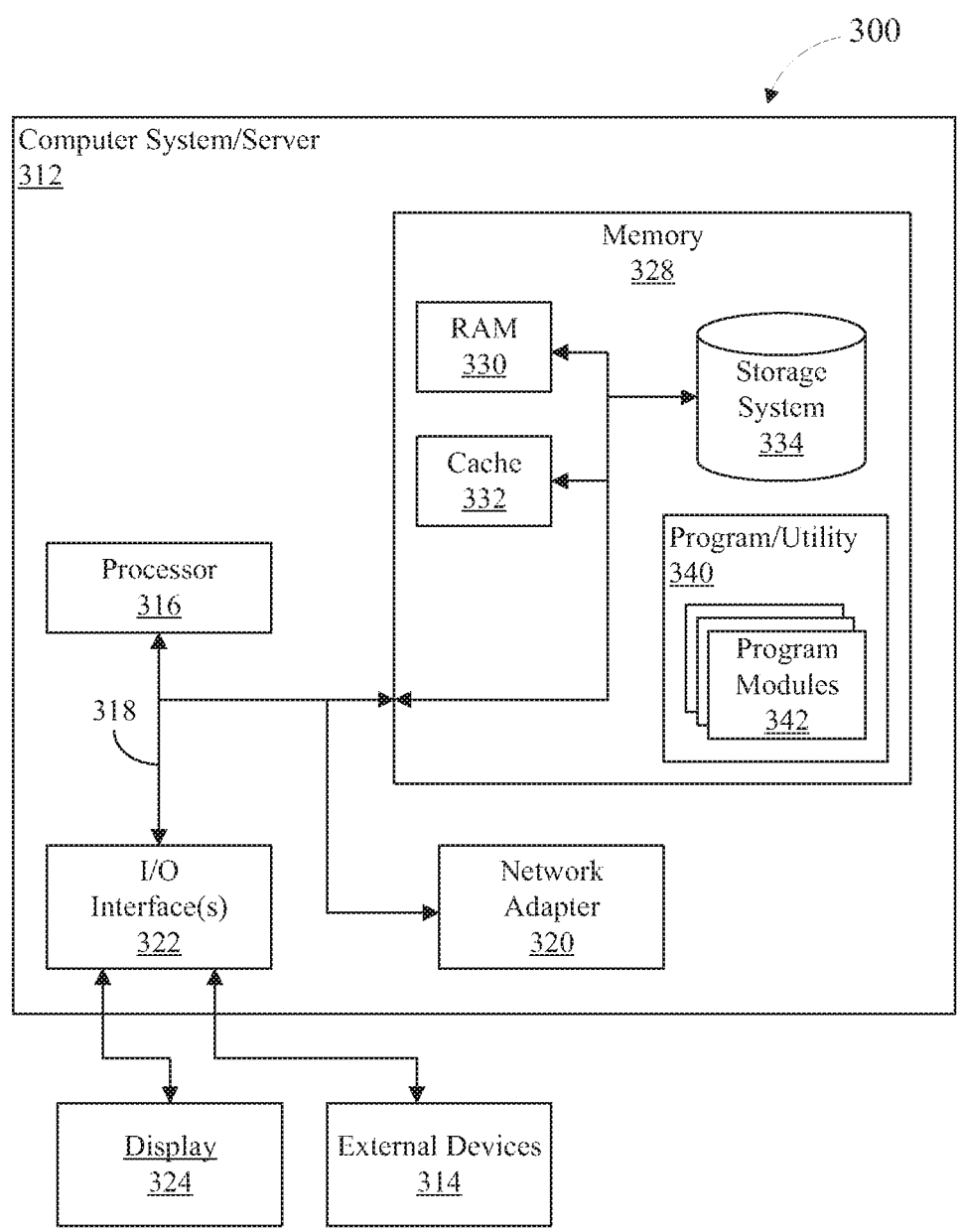
FIG. 3 depicts a cloud computing node according to an embodiment of the present invention.

Referring now to FIG. 3, a schematic of an example of a cloud computing node is shown. Cloud computing node 300 is only one example of a suitable cloud computing node and is not intended to suggest any limitation as to the scope of use or functionality of embodiments of described herein. Regardless, cloud computing node 300 is capable of being implemented and/or performing any of the functionality set forth hereinabove.

Cloud computing node 300 includes a computer 312, which is operational with numerous other general-purpose or special-purpose computing system environments or configurations. Examples of well-known computing systems, environments, and/or configurations that may be suitable for use with computer 312 include, but are not limited to, personal computers, servers, thin clients, thick clients, handheld or laptop devices, multiprocessor systems, microprocessor-based systems, set top boxes, programmable consumer electronics, network PCs, minicomputers, mainframe computers, and distributed cloud computing environments that include any of the above systems or devices, and the like.

Computer 312 may be described in the general context of computer system-executable instructions, such as program modules, executed by a computer or computing system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer 312 in cloud computing node 300 is shown in the form of a general-purpose computing device. The components of computer 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer-readable media. Such media may be any available media that is accessible by computer 312, and includes both volatile and non-volatile media, removable and non-removable media.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments described herein.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments described herein.

For example, one or more of the program modules may include system 96 or portions thereof. Program/utility 340 is executable by processor 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via Input/Output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It is understood that, although not shown, other hardware and/or software components could be used in conjunction with computer 312. Examples include, but are not limited to, the following: microcode, device drivers, redundant processing units, external disk drive arrays, RAID systems, tape drives, and data archival storage systems.

While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
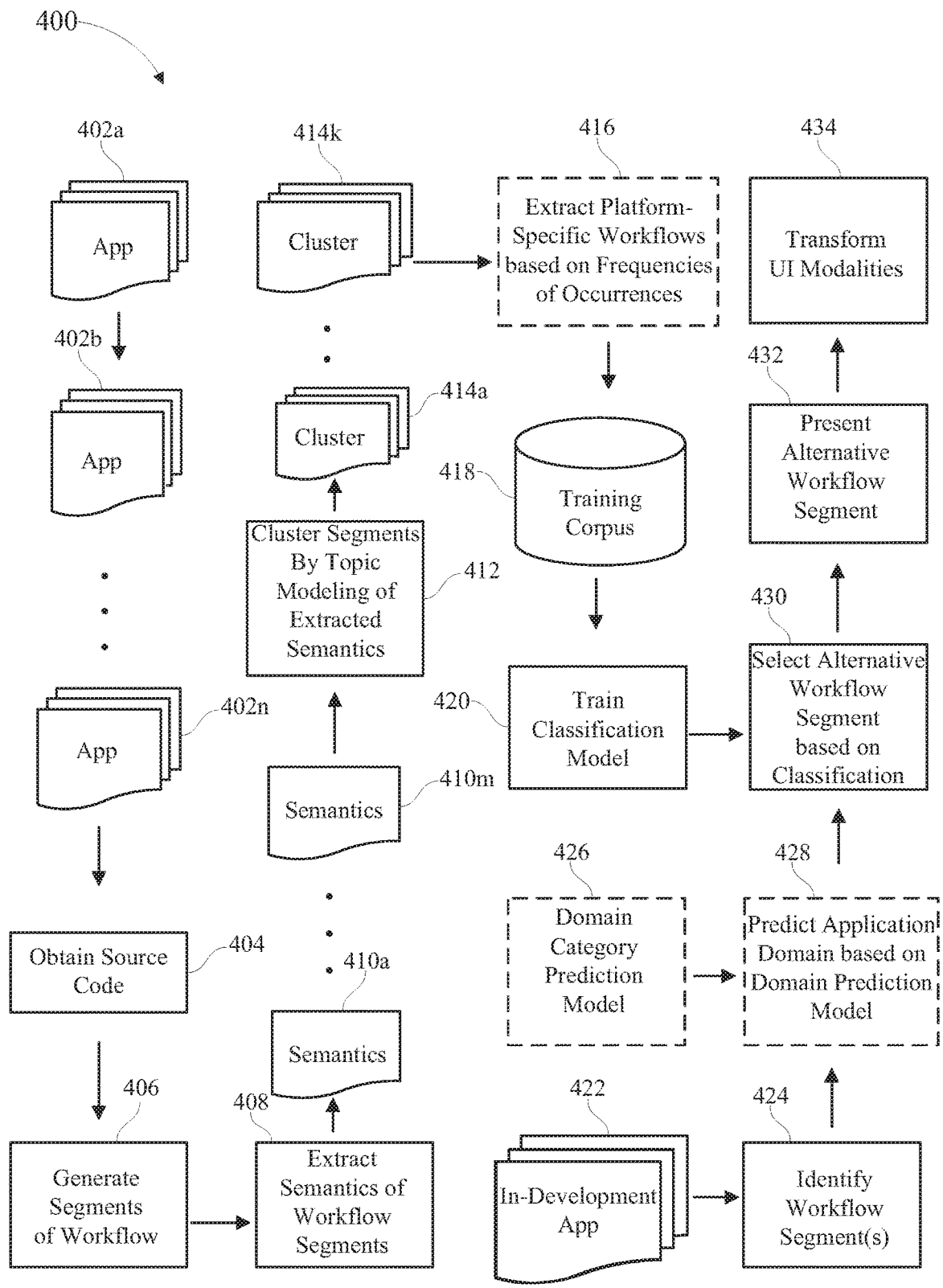
FIG. 4 depicts certain operative features of a system for automatically transforming user interface modalities of an application program according to an embodiment of the present invention.

FIG. 4 depicts certain operative features 400 of one embodiment of a system, such as system 96, for transforming the UI modalities of an application to create different versions of the application that run on different data processing platforms. One of n applications (n is any integer), illustratively shown as apps 402a and 402b through 402n, is initially downloaded to the system. Each application 402a, 402b, through 402n is characterized by an application domain (e.g., financial transactions application, messaging application, gaming application) and comprises processor-executable code executing on two or more different data processing platforms (e.g., computer, laptop, tablet, smartphone, smartwatch, smart glasses). The download to the system can include a software package (e.g., APK, APPX, Windows executable, JavaScript) in a specific file format used by the operating system of a device for installing the application and/or middleware on a device.

At block 404 the system obtains the source code of the downloaded application. In one embodiment, the source code is obtained by decompiling the downloaded statements, or instructions, constituting the application's object code (assuming the user is the owner or has the owner's permission), implemented as machine code or assembly language code (e.g., intermediate register transfer language). The system can load and parse the code, disassemble the code, structure the result, and generate a high-level code representation. The system, in various embodiments, can implement any one of different known decompiling procedures. For example, the system can create a name array and an array of literals from a plurality of code bytes and sequentially convert each into a fragment utilizing code bytes, name array, and array of literals. Each fragment is added to a fragment array to render code readily understandable by a user.

The code corresponds to the workflow generated by executing the code and refers to the functions performed by segments of the application code (workflow segments) when the application executes on the processor of a data processing platform. Distinct workflow portions of code (workflow segments) for performing specific functions are captured and segmented at block 406.

At block 408 the system extracts the semantics of the source code obtained at block 404. The semantics describe the various workflow segments in terms of the distinct functions performed. For example, in the context of a web-based application, a function can be described as "present textbox" and "respond to user's clicking on textbox." Similar semantics, in the context of the same application executing on a smartphone, can describe comparable functions: "display on-screen keyboard" and "respond to user's touch on screen." Likewise, in the context of a smartwatch, "open voice input interface" and "respond to user's click on reply button" are similar semantics describing functions comparable to those performed with the web-based application and the smartphone. Different code executing on different platforms can perform essentially the same, or a comparable, function (e.g., login, purchase an item, book a reservation). Accordingly, based on similar semantics, a function performable on one data processing platform can be identified with a comparable function performable on a different platform based on the semantical similarity of the description of the functions implemented in processor-executable code.

In one embodiment, the UI components are obtained from the accessibility text of the application. Thus, the extracted semantics can be used not only to describe both the functions that each segment of the application workflow performs, but also corresponding UI elements or components through which a device user interacts with the application.

The operations at blocks 404-408 can be repeated with each of applications 402a-402n to generate an m-member (m is any integer) corpus of semantical data (semantics 410a through 410m) extracted from the applications. The semantics extracted from applications 402a-402n represent the workflow segments and corresponding UI components of different UI modalities of the applications.

At block 412 the system clusters the semantical data into k clusters (k is any integer) 414a through 414k based on semantical similarities using topic modeling. Each cluster comprises semantically similar workflows and corresponding UI components. For example, a workflow segment for entering a password into a textbox presented on a computer monitor is clustered with a workflow for entering a password with voice input to a smartwatch and a workflow for entering a password by touching the on-screen display of a smartphone. With respect to each workflow segment and corresponding UI components, the semantical similarity is "enter password," which can be included in a workflow category or cluster denoted "login workflow." In addition to a login workflow, other semantical groupings or clusters can include a "call workflow," "admin workflow," "file sharing workflow," "messaging workflow," and "contact workflow," as well as various other workflow categories for performing various other functions with an application.

In one embodiment, the system clusters the semantical data using latent Dirichlet allocation (LDA). LDA is a generative probabilistic, three-level hierarchical Bayesian model for analyzing discrete data such as text corpora. Each item of a collection (e.g., text corpus) is modeled as a finite mixture over an underlying set of topics, and each topic is modeled as an infinite mixture over an underlying set of topic probabilities. In the present context, the extracted semantical data (semantics 410a through 410m) that describe workflow segments and corresponding UI components can be treated as any text corpora and analyzed using LDA to identify clusters and extract workflow indicia based on the semantical data.

In other embodiments, the system implements other probabilistic topic modeling procedures for discovering and annotating the semantical data (semantics 410a through 410m). The discovery and annotation are based on statistical methods that analyze the word descriptions (semantics) to discover the clusters of workflows, segments, and corresponding UI components. LDA and other such procedures not only discover and annotate these elements, but also determine connections among the elements and how the elements change, or are transformed, when workflow segments are ported from one data processing platform to another.

Optionally, the system, at block 416, applies statistical analysis to each of the workflow clusters and, based on the analysis, extracts platform-specific workflow segments. The system can determine the top-K workflow segments (K is any integer) for each form-factor or data processing platform based on the frequency of occurrence of each workflow segment across different application domains.

Groupings, or clusters, 414a through 414k of the extracted semantical data 410a through 410m provide a corpus 418 of training data used by the system to generate a classification model at block 420. Using machine learning, the classification model learns to recognize patterns in porting an application from one data processing platform to one or more other platforms. The patterns reflect substituting semantically similar workflow segments one for another to change one version of an application for one platform into a different version for a different platform. A workflow segment and UI modality for a version of an application that runs on one platform will be replaced by a semantically similar workflow and corresponding UI modality for performing a comparable function on a different platform.

In certain embodiments, the system uses deep learning (e.g., deep neural network, such as recurrent neural network and/or convolutional neural network) to train the model. For example, in one embodiment, the system implements deep learning using a multi-layer neural network to train a multiclass classification. For such a model, a vocabulary is generated. The vocabulary comprises words (optionally limited to words most frequently used) that describe workflow segment functions (semantical descriptions). The vocabulary words are indexed to create a list of word indices (integers). The word indices can be put in the form of a tensor, or "vectorized," using categorical encoding, for example, to provide input for training the model. As with such neural networks generally, the system generates a set of weights whose values, initially, are randomly set and then refined through successive iterations until the model classifies input data with an acceptable level of accuracy.

In other embodiments, the system uses statistical methods (e.g., pointwise mutual information, collaborative filtering) to learn prior choices made by developers when choosing alternate workflow segments and corresponding UI modalities of different platform-specific versions of applications. Based on the analysis, confidence levels are obtained and the learned associations that have training confidence levels above a predetermined threshold are chosen by the system in recommending workflow substitutions for porting an application being developed for one platform to another platform.

Still referring to FIG. 4, once the model is trained based on data from previously developed applications, the system applies the model with respect to new applications. In developing a new application, all or portions of the code of the in-development application 422 are provided to the system. The system, at block 424, identifies one or more workflow segments from the code of the in-development application 422. The domain of the application (e.g., messaging application, news retrieval application, e-commerce application) is identified by the system based on attributes of the code. Optionally, the system can include a domain category predictor for predicting application domains based on domain prediction model 426, which is trained using machine learning (e.g., deep learning). Accordingly, the system can predict the application domain while the application is yet undergoing development by applying the model at block 428.

At block 430, having identified a workflow segment of the in-development application 422 at block 424, the system selects one or more other workflow segments for transforming the UI modality of the application. The system effects a UI modality transformation by selecting a workflow segment for performing on a different processing platform a function comparable to the function performable with the workflow segment identified at block 424. The selected workflow segment (or segments) is selected from a set of alternative workflow segments comprising workflow segments that are semantically similar to the workflow segment identified at block 424. The alternative workflow segments are determined as described above and constitute part of the training corpus 418 used to train classification model 420. The system selects workflow segments based on classifying the identified workflow segment with the classification model trained at block 420 using machine learning. The model maps workflow segments and corresponding UI modalities to different processing platforms. The mappings can be based on the application domains and tracked substitutions of semantically similar workflow segments. The substitution of one workflow segment for a semantically similar workflow segment can convert one version of an application that runs on one data processing platform into a different version that runs on a different data processing platform using different UI modalities.

At block 432 the system presents alternative workflow segments, each of which can change a version of in-development application 422 into a different version that runs on a different data processing platform using different UI modalities. In a specific embodiment, the system recommends different alternative workflow segments to a system user by rank ordering a list of alternatives. The rank-ordered list can comprise the top-K (K is any integer) workflow segments that facilitate an application running on specific data processing platforms using different UI modalities. The ranking is determined by statistical analysis of the frequencies of occurrence of the workflow segments across applications. Under the reasonable assumption, noted above, that over time developers choose the most appealing UI modalities, the system essentially discovers through statistical analysis the most user-friendly modes for interacting with an application.

At block 434 the system automatically transforms a UI modality of the in-development application 422. The system can automatically transform the UI modality by substituting a second code segment for a first code segment, wherein the first code segment corresponds to a first workflow segment, and the second code segment corresponds to a semantically similar workflow segment that performs a function comparable to the function performable by the first workflow segment when executed on a different data processing platform. If more than one alternative workflow segment is presented at block 432, then the second code is determined based on which of the multiple workflow segments presented are selected by a user. In one embodiment, the system includes a voice recognition capability that recognizes a user's voice inputs, including voice input indicating the user's selection of an alternative workflow segment for transforming the UI modality of in-development application 422.

Figure 5:
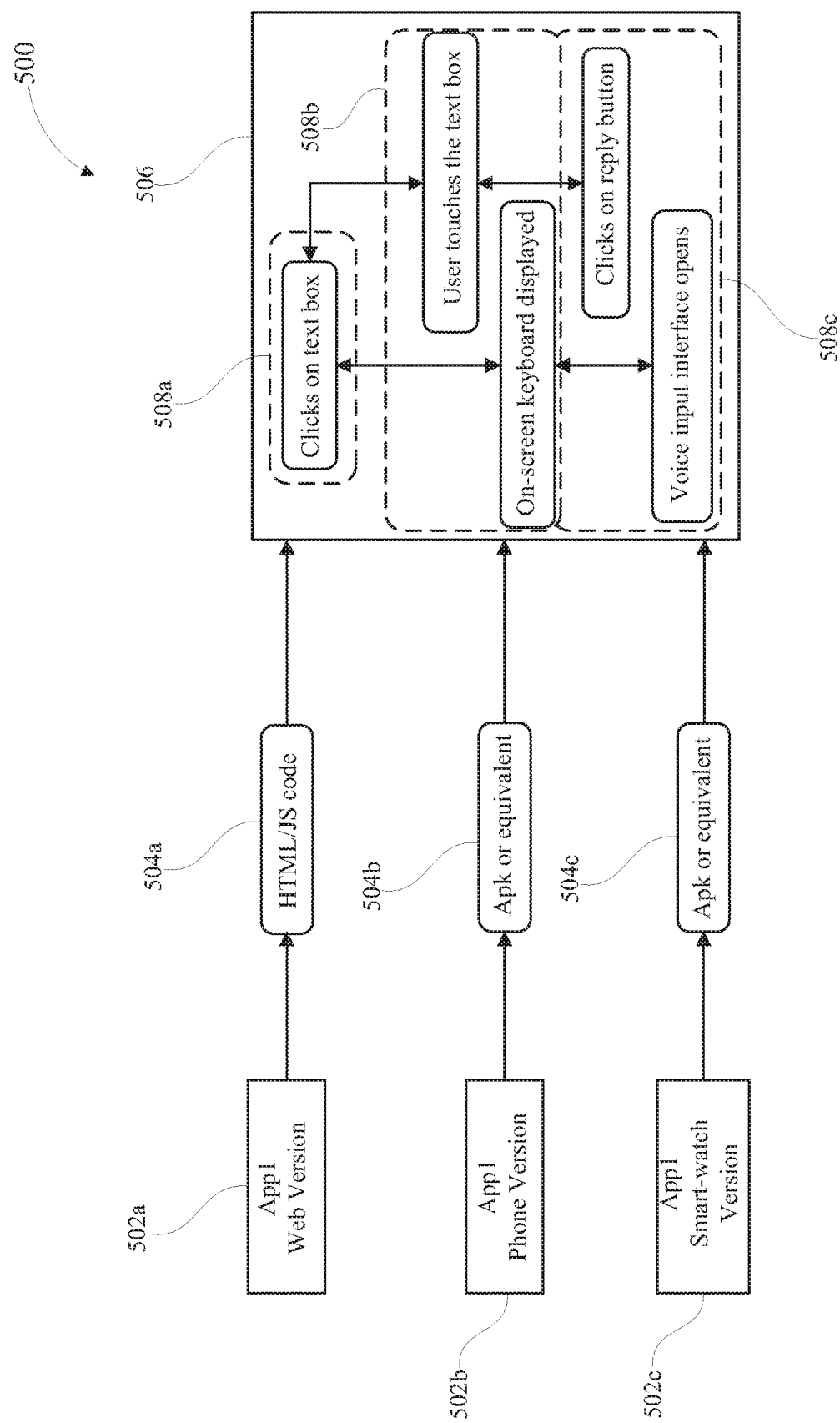
FIG. 5 depicts an example of a process performed by a system for automatically transforming user interface modalities of an application program according to an embodiment of the present invention.

FIG. 5 depicts an example 500 of a system generating training data from an application, the data for training a classification model used in transforming UI modalities of an in-development application. The example 500 pertains to a segment of an application workflow for logging in to a device, the workflow segment corresponding to the manner with which a user enters text or voice inputs as part of the workflow of the application. Three versions of the application are shown, each of which executes on a different type of data processing platform: a web-based version 502*a*, a smartphone version 502*b*, and a smartwatch version 502*c*. Using any of the procedures described above for obtaining source code, the system obtains source code 504*a* (e.g., HTML or Java Script) for the web version, source code 504*b* (e.g., APK or other application package kit code) for the smartphone version, and source code 504*c* (e.g., APK or other application package kit code) for the smartwatch version. The system, again using the above-described procedures, extracts from the source code the semantics 506 of the workflow segments for each version of the application. For the web version in this example, the semantics 508*a* are user "clicks on text box" using UI components (not shown) such as computer keyboard and monitor. For the smartphone version, the similar semantics 508*b* for performing a comparable function are "user touches the textbox" of an on-screen display, in response to which an "on-screen keyboard is displayed" 508b. Similarly, for the smartwatch version, the similar semantics 508c for performing a comparable function are user "clicks on reply button" and in response a "voice input interface opens." Semantics 508a-508c correspond to the semantically similar workflow segments for performing on different processing platforms, a comparable function—specifically, inputting data to a device.

Figure 6:
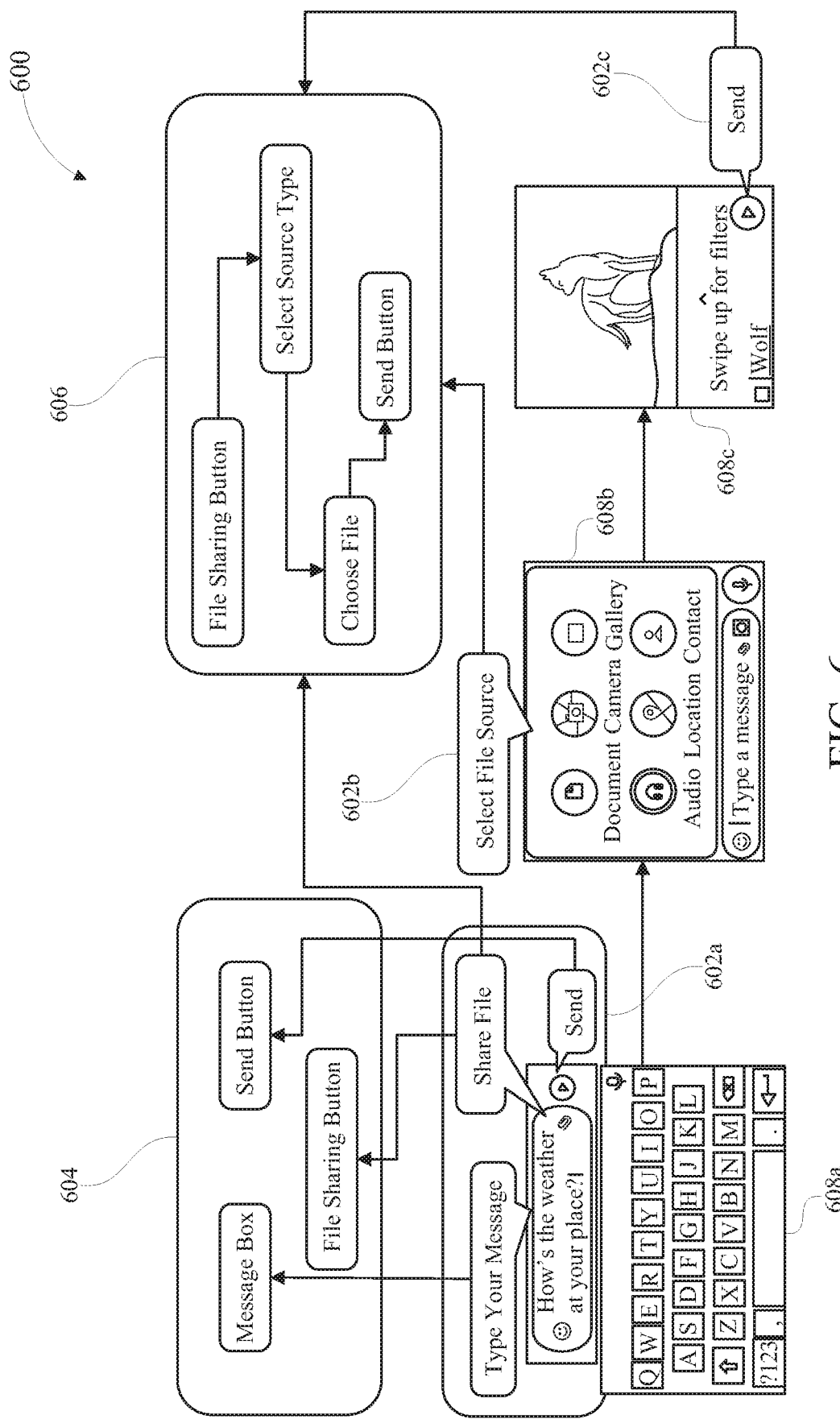
FIG. 6 depicts an example of a process performed by a system for automatically transforming user interface modalities of an application program according to an embodiment of the present invention.

FIG. 6 depicts an example 600 of the system determining UI components corresponding to workflow segments using accessibility text. Accessibility text 602a, 602b, and 602c connect UI components 604 and corresponding workflow segments 606. As illustrated, the accessibility text identifies the UI components—on-screen keyboard 608a, display of files 608b, and file-send component 608c—for performing functions described as entering a message, selecting a file, and sharing the file by sending the message with the file attached using the distinct UI components.

Figure 7:
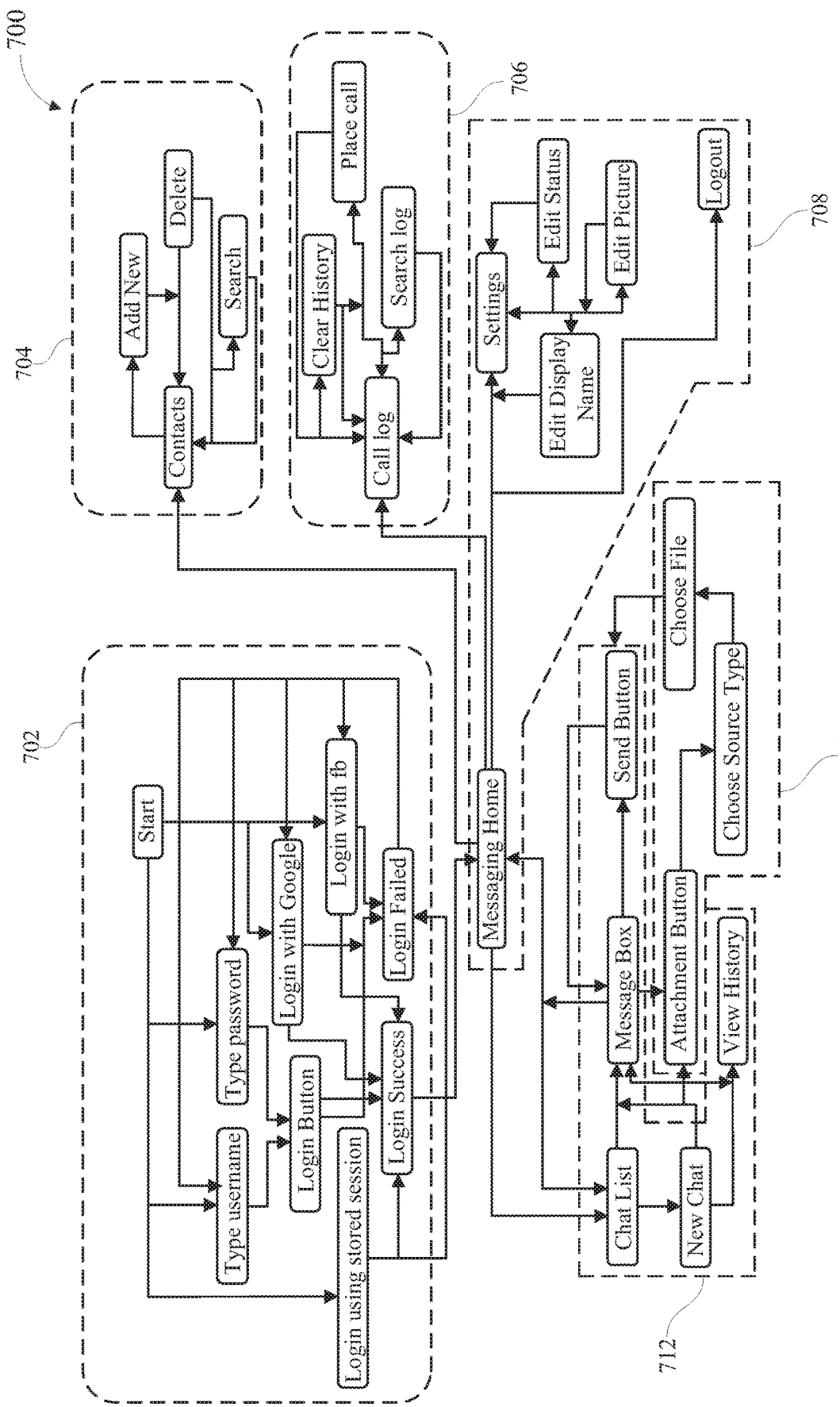
FIG. 7 depicts an example of a process performed by a system for automatically transforming user interface modalities of an application program according to an embodiment of the present invention.

FIG. 7 depicts an example 700 of the system clustering semantically similar workflow segments. The workflow segments, illustratively, include login workflow cluster 702, contacts workflow cluster 704, call workflow 706, admin workflow 708, file sharing workflow cluster 710, and messaging workflow cluster 712. As shown, each workflow cluster 702-712 contains similar semantics describing workflow segments for performing comparable functions on different data processing platforms.

Figure 8:
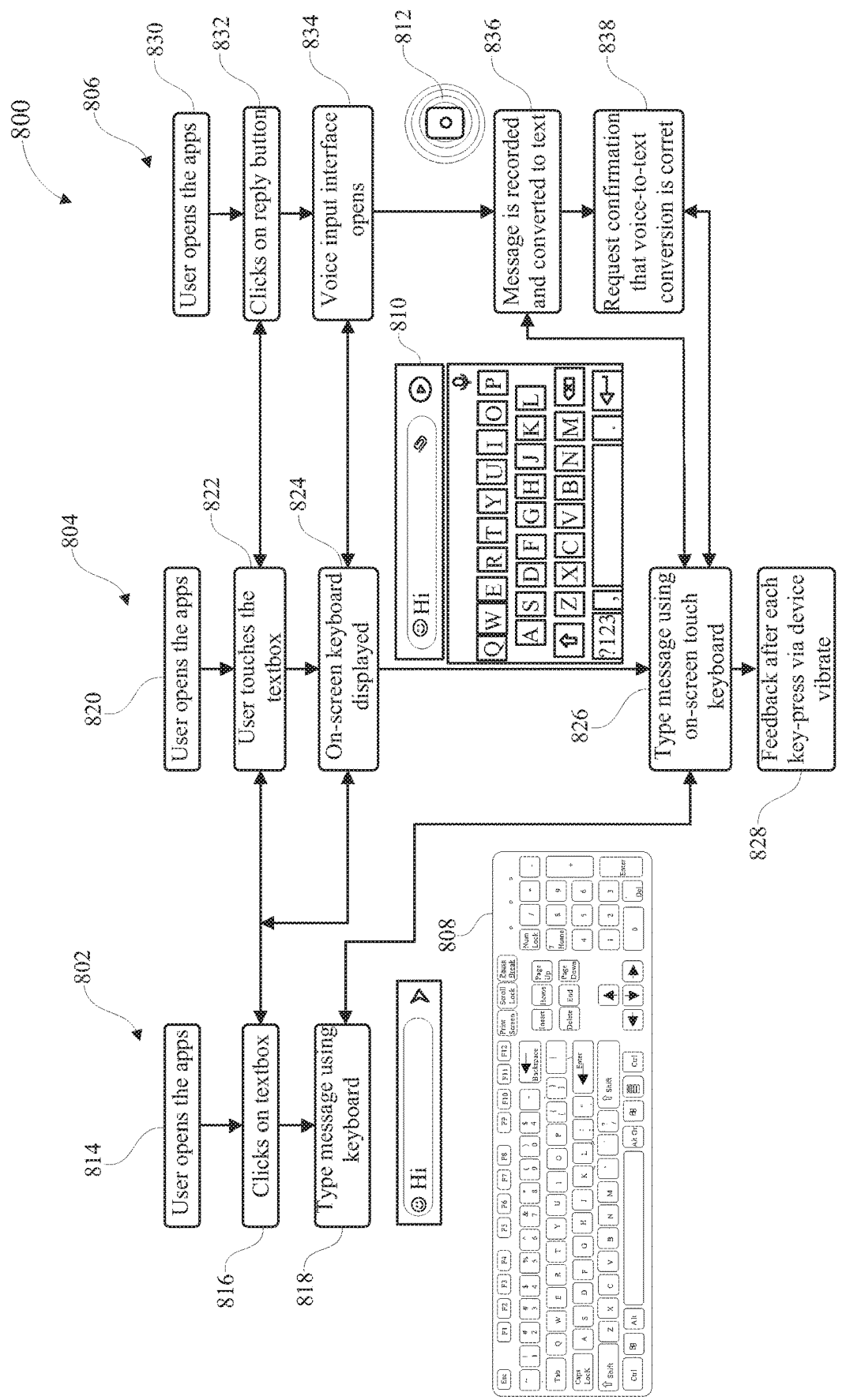
FIG. 8 depicts an example of a process performed by a system for automatically transforming user interface modalities of an application program according to an embodiment of the present invention.

FIG. 8 depicts an example 800 of three workflow segments 802, 804, and 806 for performing a function on three different data processing platforms. Workflow segments 802 are illustratively part of a web-based application executing on a computer (e.g., laptop or tablet) using keyboard 808 as the UI component. Illustratively, workflow segments 804 are performed on a smartphone using on-screen touch keyboard display 810 as the UI component and, and workflow segments 806 are performed on a smartwatch using voice-based UI component 812. With workflow segments 802, a user initially opens the application at 814, clicks on a textbox at 816, and types a message at 818 using the keyboard 808. The same functionality is provided on the smartphone. Using the smartphone, the user opens the application at 820 and touches the textbox at 822, which at 824 invokes the UI component, on-screen touch keyboard 810. The user types a message at 826 using the on-screen touch keyboard 810, and the smartphone vibrates after each key press at 828, thereby providing user feedback. The same functionality is also provided with workflow segments 806 when executed by the smartwatch. The user opens the application at 830 and clicks on a reply button at 832, which at 834 opens the voice interface 812 of the smartwatch. The user's message is recorded and converted to text by the smartwatch at 836, and the smartwatch, at 838, requests that the user confirm the correctness of the voice-to-text conversion.

Figure 9:
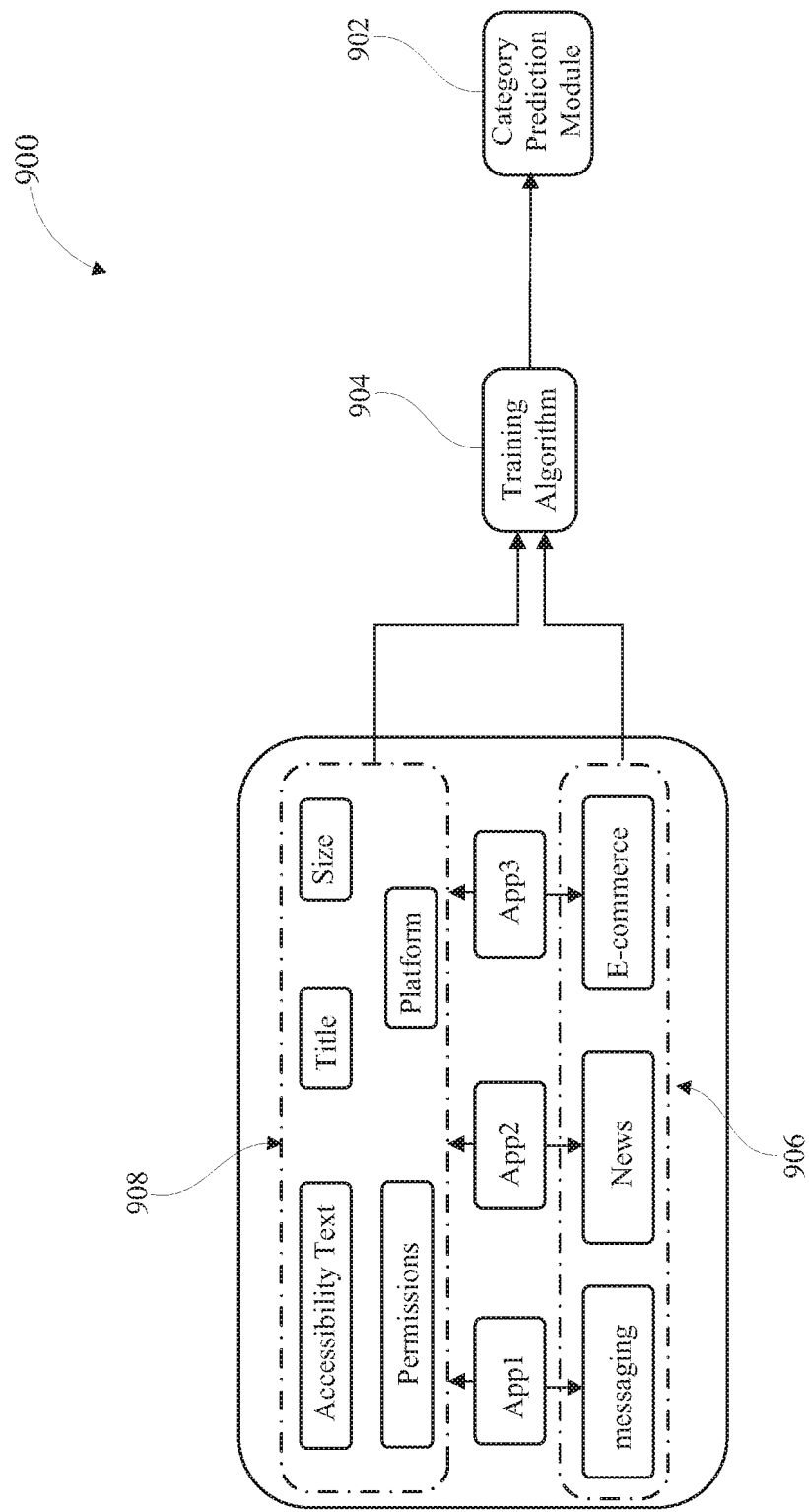
FIG. 9 depicts an example of a process performed by a system for automatically transforming user interface modalities of an application program according to an embodiment of the present invention.

FIG. 9 depicts an example 900 of the system's optional feature of predicting the domain (e.g., messaging application, news retrieval application, e-commerce application) of an application while the application is yet under development. Whether predicted using the optional feature or provided directly by the developer developing the application, the application's domain is part of the system input given the effect the domain has on the appropriateness of UI modalities. For example, data entry with a keyboard for the web-based version of an application can translate to voice input in porting the application to a smartphone or smartwatch if the application is a gaming application. But the result would be different, for example, if the application were a financial application, in which event, at least in some circumstances, voice would not be a sufficiently secure input modality. The optional feature for predicting an application's domain while the application is being developed can include a domain category predictor 902 that is trained using a machine learning algorithm 904 (e.g., deep learning) to predict an application's domain during development of the application, the prediction based on data collected from multiple domain-specific applications 906 (e.g., messaging application, news retrieval application, e-commerce application) and application features (e.g., title, platform, size, permissions, accessibility text). The data can be input to the system in the form of feature vectors corresponding to domain-specific attributes such as application title, size, permissions, accessibility text, and platform on which the application runs. Using the model, the system can predict the application's domain while the application is yet undergoing development.

Figure 10:
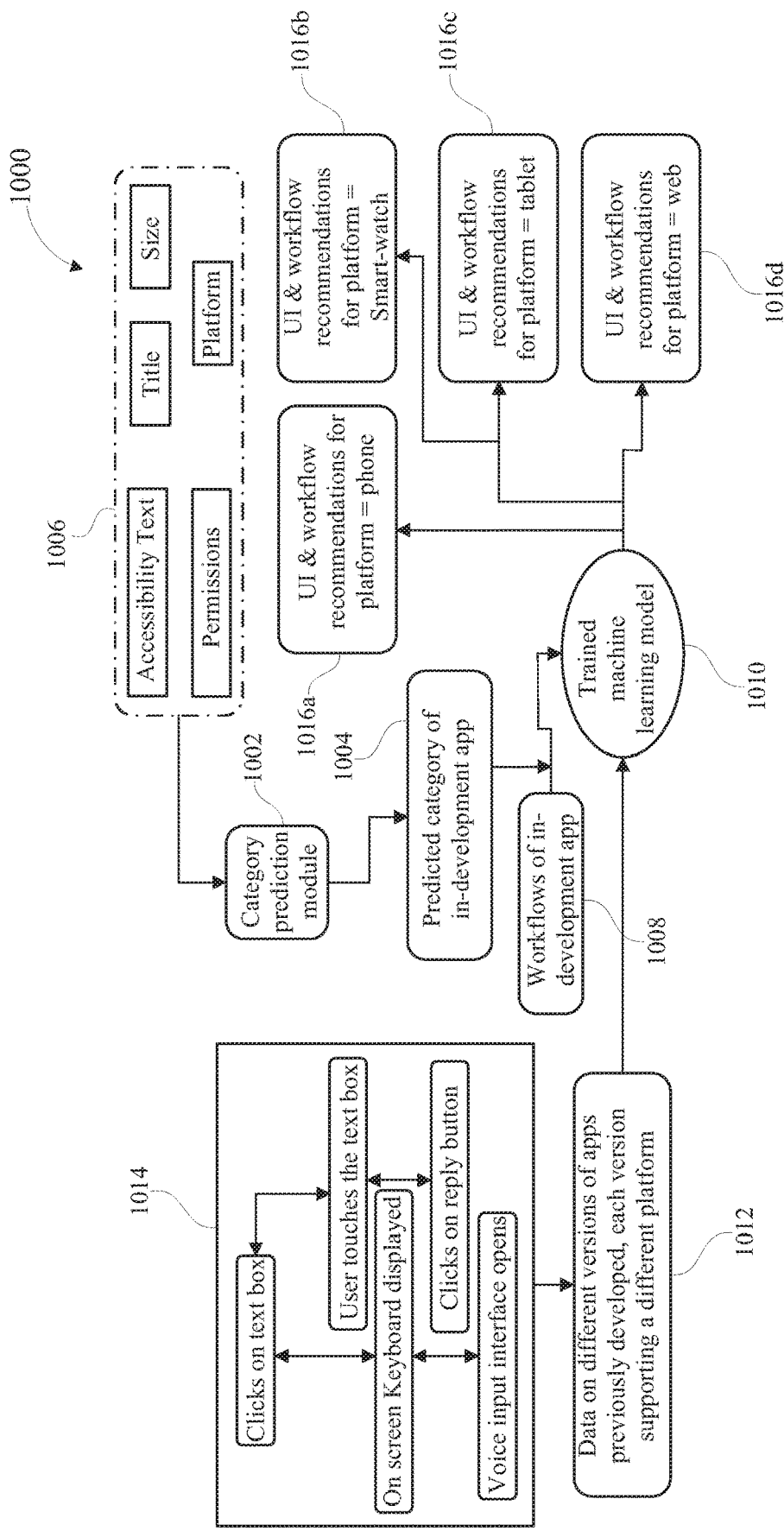
FIG. 10 depicts an example of a process performed by a system for automatically transforming user interface modalities of an application program according to an embodiment of the present invention.

FIG. 10 depicts an example 1000 of recommendations made, according to one embodiment, of a system for transforming the UI modalities of an in-development application. Illustratively, the system includes the optional category prediction module 1002, which provides a predicted category 1004 indicating the domain (e.g., messaging, news retrieval, e-commerce) of the application as the application is in the process of development, that is, as the developer is developing code configured to execute on a specific data processing platform. The prediction is based on a set of features 1006 (e.g., title, platform, size, permissions, accessibility text) of the in-development application. (If the developer is porting an existing application from one platform to another, the application domain can be prespecified and the system automatically proceeds without needing to make the prediction.) Workflow segments 1008 and domain (based on predicted category 1004 or specified by the developer) are input to model 1010, which is trained using any of the previously described machine learning techniques. Model 1010 is trained using data corresponding to different versions of applications 1012 previously developed, each version supporting a different data processing platform on which a corresponding application runs on. The data 1012 comprises the semantics 1014 of the workflow segments of each of the different versions of the previously developed applications.

Based on classifications made by model 1010, the system recommends workflows and corresponding UI modalities for one or more platforms. Illustratively, a set of workflow and UI modalities recommendations are made for each of the following: smartphone recommendation 1016a; smartwatch recommendation 1016b; tablet recommendation 1016c; and web-based application recommendation 1016d. If the application is in-development, the recommendations can be generated in real-time and presented in-real time to a developer as the developer is creating the application.

The system generates recommendations based on platform-specific versions of a wide variety of applications from different domains. The system, in one embodiment, generates the recommendations by learning, using machine learning, association rules. The association rules can provide statistical confidence levels for each platform-specific recommendation. For example, with respect to a "messaging app," the system collects data for different versions for specific platforms (e.g. web, smartphone, smartwatch) and identifies platform-specific patterns among the applications, such as all the following: (1) web-based applications uniformly use a textbox as input; (2) 85% of the applications' smartphone versions use textbox with on-screen keyboard, while a remaining 15% also provide support for voice input;

(3) 20% of the smartwatch versions use voice input only, while 50% have 12-key-keypad plus voice, and 25% have only 12-key keypad, with only 5% using on-screen keyboard. Based on the statistics of the input workflow segment, the system learns the following association rules:

(input=Text box, platform=web)=>(input=on screen keyboard, platform=phone) confidence=0.85;

(input=Text box, platform=web)=>(input=Voice+12-key keypad, platform=smartwatch) confidence=0.5;

(input=on screen keyboard, platform=phone)=> (input=text box, platform=web) confidence=1; and (input=on screen keyboard, platform=phone)=> (input=Voice+12-key keypad, platform=smartwatch) confidence=0.37.

Based on these rules, if the developer adds a textbox with on-screen keyboard in a smartphone-based application, the system will generate rank-ordered recommendations in the following order (confidence levels in parentheses):

Add a text box for the web version (1.00);
Add voice+keypad for smartwatch version (0.37); and
Add voice only for a smartwatch version (0.16).

The recommendations can be generated in real-time as the developer is creating code for one version of the application to run on one data processing platform. The system can allow the developer to select a recommendation and, in response, generate object code that performs the recommended workflow segment on the specific data processing platform (e.g., web, smartphone, smartwatch). Thus, a UI modality of the application is transformed by the system automatically substituting a second code segment for a first code segment, the first code segment corresponding to a workflow segment that executes on one platform and the second code segment corresponding to another workflow segment that performs a comparable function on a different data processing platform.

Figure 11:
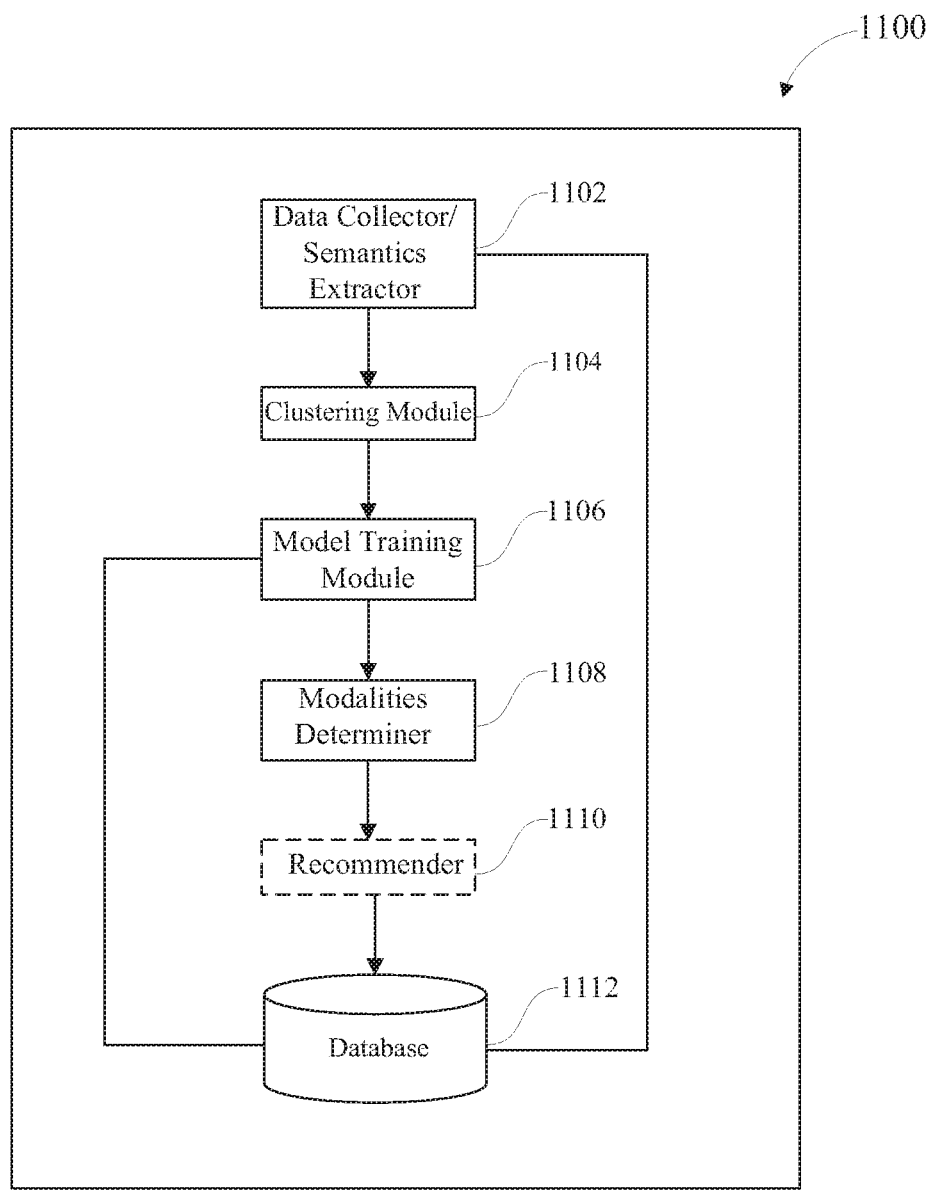
FIG. 11 depicts an architecture of a system for automatically transforming user interface modalities of an application program according to an embodiment of the present invention.

FIG. 11 depicts an architecture of a system 1100 for transforming platform-specific UI modalities of an application according to one embodiment. System 1100 can be implemented in hardwired circuitry and/or software code that executes on one or more processors (e.g., CPU or GPU) of a computer, such as computer 312 of FIG. 3. Illustratively, system 1100 includes data collector/semantics extractor 1102, workflow segment clustering module 1104, training module 1106, modalities determiner 1108, optional recommender 1110, and database 1112. Data collector/semantics extractor 1102 collects model-training data from multiple, platform-specific versions (e.g., computer, laptop, tablet, smartphone, smartwatch, smart glasses) of various applications, and determines the source code of each using any of the techniques described above (e.g., permissible decompilations of machine or assembly-language code). From the source code, data collector/semantics extractor 1102 extracts the semantics of each of the platform-specific versions of the application's workflows.

Clustering module 1104 groups semantically similar workflow segments. The clustering can be based on a predetermined metric (e.g., Euclidean distance). Clustering module 1104 implements any of the techniques described above (e.g., topic modeling) to cluster the semantically similar workflow segments. The semantically similar workflows and corresponding UI modalities provide data that is fed to model training module 1106, which trains a classification or predictor model using machine learning (e.g., deep learning), as also described above. Modalities determiner 1108 determines one or more workflow segments to change a version of an in-development application to enable the application to run on alternative data processing platforms using different UI modalities. Optionally, system 1100 includes recommender 1110, which in the event that the system identifies multiple alternative workflow segments, generates a rank-order list indicating the top-K workflow segments based one a statistical analysis of previously developed applications.

System 1100 also includes database 1112, which electronically stores the model and model-training data. Data collector/semantics extractor 1102 is communicative linked to database 1112, which receives and electronically stores data collected by the data collector/semantics extractor. Database 1112 is communicatively linked to model training module 1106 and provides data collected by data collector/semantics extractor 1102 to the module for training the classification model. System 1100 can add new data on an on-going basis and can refine the model as new data is added.

Figure 12:
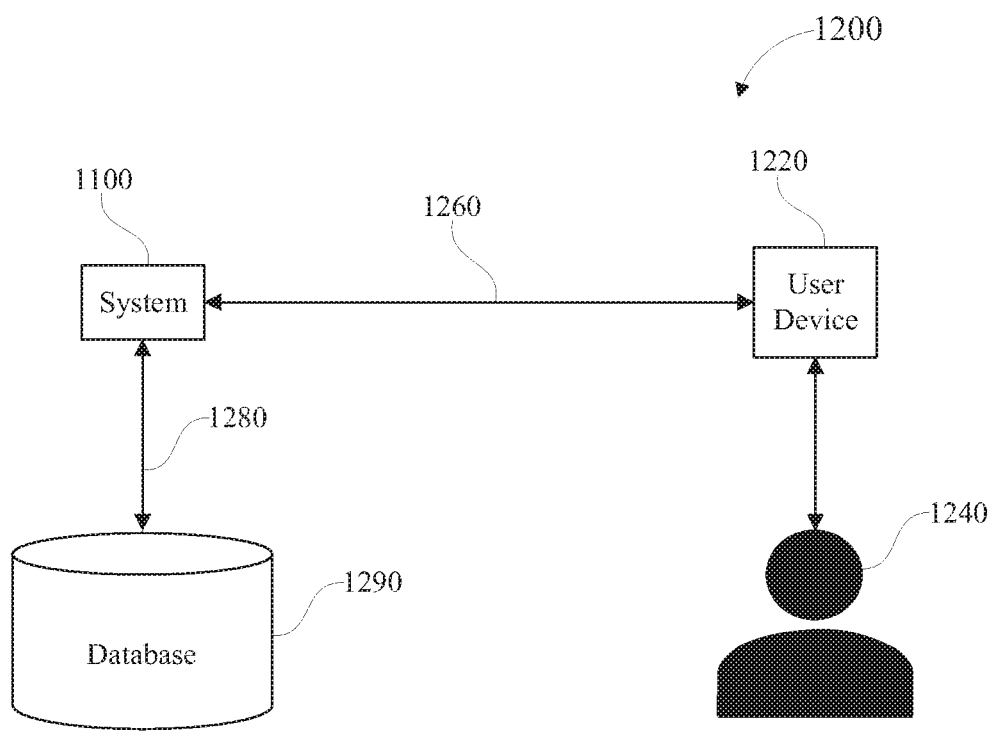
FIG. 12 depicts an operating environment of a system for automatically transforming user interface modalities of an application program according to an embodiment of the present invention.

In one embodiment, system 1100 is implemented as a server. FIG. 12 depicts an operating environment 1200 in which system 1100 is a server that connects to device 1220 on which runs an IDE or other type of software used by developer 1240 to develop one or more software applications. System 1100 can be a cloud-based server that is communicatively coupled with device 1220 via communications link 1260. All though shown as a single device via a single connection, communication link 1260 can be a one-to-many connection that links system 1100 to multiple devices used by multiple application software developers. System 1100 can receive via communication link 1240 data, the data corresponding to the workflow of in-development application. Based on the received data, system 1100 segments the workflow into distinct workflow segments. System 1100 identifies a first workflow segment corresponding to a UI modality through which an application user interacts with the application running on a specific data processing platform. System 1100 determines, using a trained model, at least one other workflow segment that performs on a different data processing platform a function comparable to the function performable by the first workflow segment, but using a different UI modality through which the application user can interact with the application. If there are more than one other semantically similar workflow segments, the system can recommend all or a select subset of such workflow segments. The system can rank order the list to indicate to developer 1240 the top-K (K is any integer) workflow segments based on the segments' frequency of use across multiple previously developed applications.

System 1100 also can access via communication link 1280 database 1290 on which is stored code for various versions of platform-specific software applications. The code provides the data for training, using machine learning, the classification model that determines one or more alternative workflow segments and corresponding UI modalities from a set of semantically similar workflow segments. Although illustratively only a single such database is shown, system 1100 can access multiple databases to obtain training data.

Figure 13:
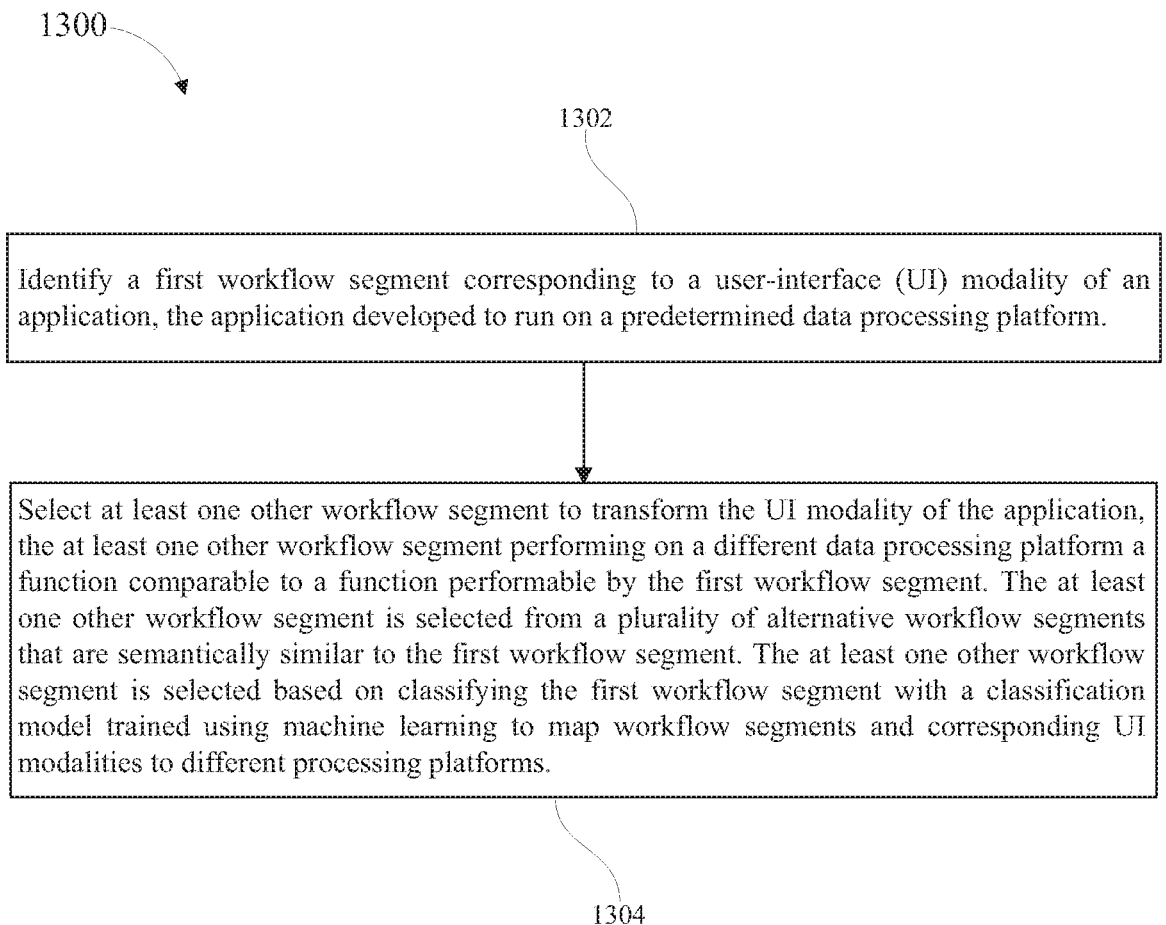
FIG. 13 is a flowchart of a method of automatically transforming user interface modalities of an application program according to an embodiment of the present invention.

FIG. 13 is a flowchart of a method 1300 of transforming platform-specific UI modalities of an application according to one embodiment. Method 1300 can be performed by a system the same or similar to the systems described in connection with FIGS. 1-12. The method can begin with an application developer providing to the system a workflow of an in-development application. The system optionally segments the workflow of the in-development application.

At 1302, the system identifies a first workflow segment corresponding to a UI modality of the application, the application developed to run on a predetermined data processing platform using the UI modality. The system, at 1304, automatically selects one or more other workflow segments to transform the UI modality of the application. The system transforms the UI modality by selecting at least one other workflow segment that performs on a different data processing platform a function comparable to a function performable by the first workflow segment. The one or more selected workflow segments correspond to one or more UI modalities through which an application user interacts with the application, each UI modality used in executing the application on one or more data processing platforms different from the predetermined data processing platform.

The system automatically selects the one or more alternative workflow segments from a multi-member set of alternative workflow segments that are semantically similar to the first workflow segment. The system's automatic selection is based on classifying the first workflow segment with a classification model trained using machine learning to map workflow segments and corresponding UI modalities to different processing platforms.

Figure 14:
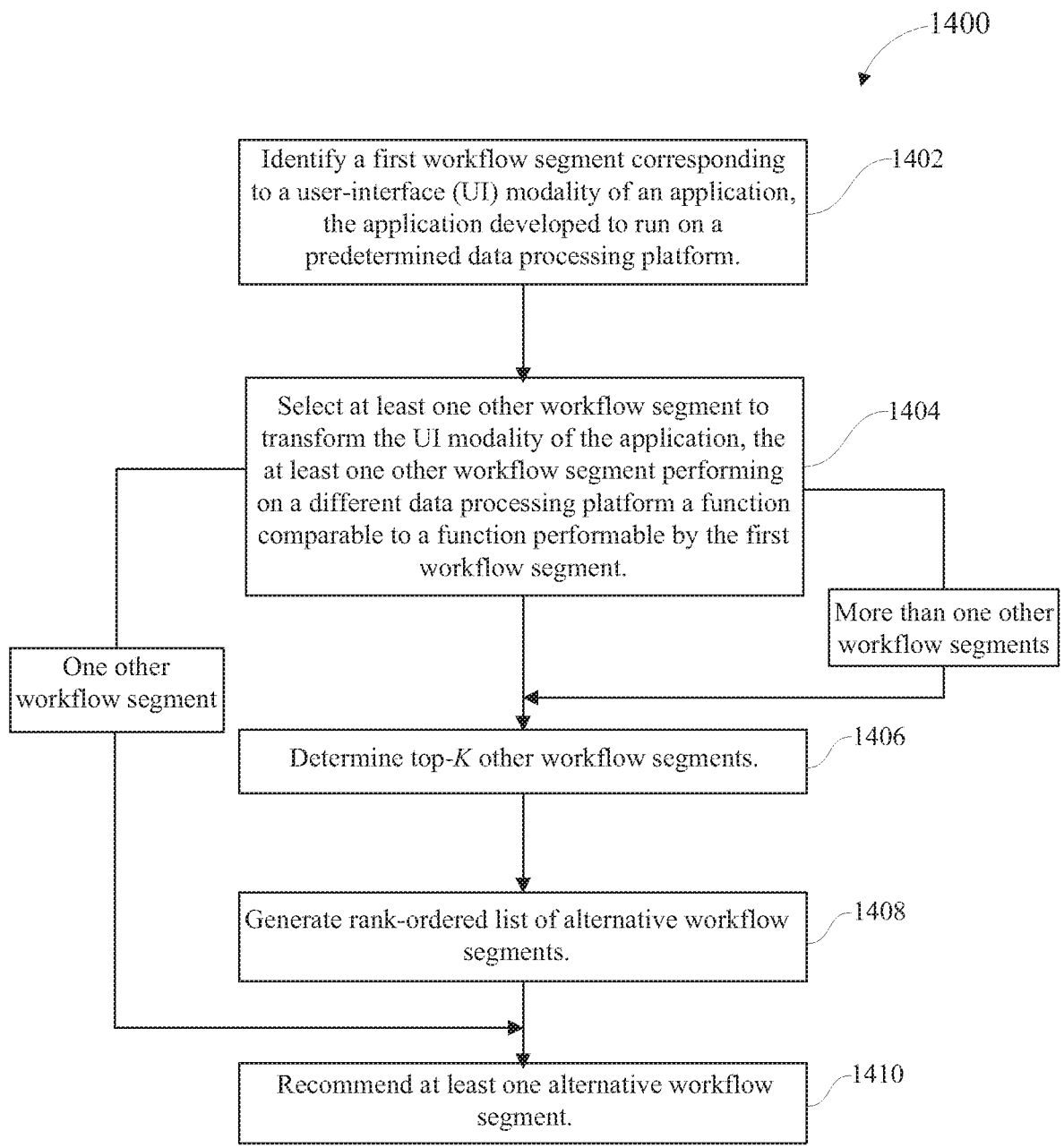
FIG. 14 is a flowchart of a method of automatically transforming user interface modalities of an application program according to an embodiment of the present invention.

FIG. 14 is a flowchart of a method 1400 of transforming platform-specific UI modalities of an application according to another embodiment. Method 1400 can also be performed by a system the same or similar to the systems described in connection with FIGS. 1-12. The method can begin at 1402 by identifying a first workflow segment corresponding to a UI modality of an application, the application developed to run on a predetermined data processing platform. At least one other workflow segment is selected at 1404 to transform the UI modality of the application, the at least one other workflow segment performing on a different data processing platform a function comparable to a function performable by the first workflow segment. If at 1404 more than one other workflow segment is selected, then the system determines the top-K (K is any integer) other workflow segments at 1406 and generates a rank-ordered list of alternative workflow segments. At 1410, the system recommends alternative workflow segments from the rank-ordered list. If there is only one other workflow segment at 1404, however, then that workflow segment is recommended to a system user at 1410.

Figure 15:
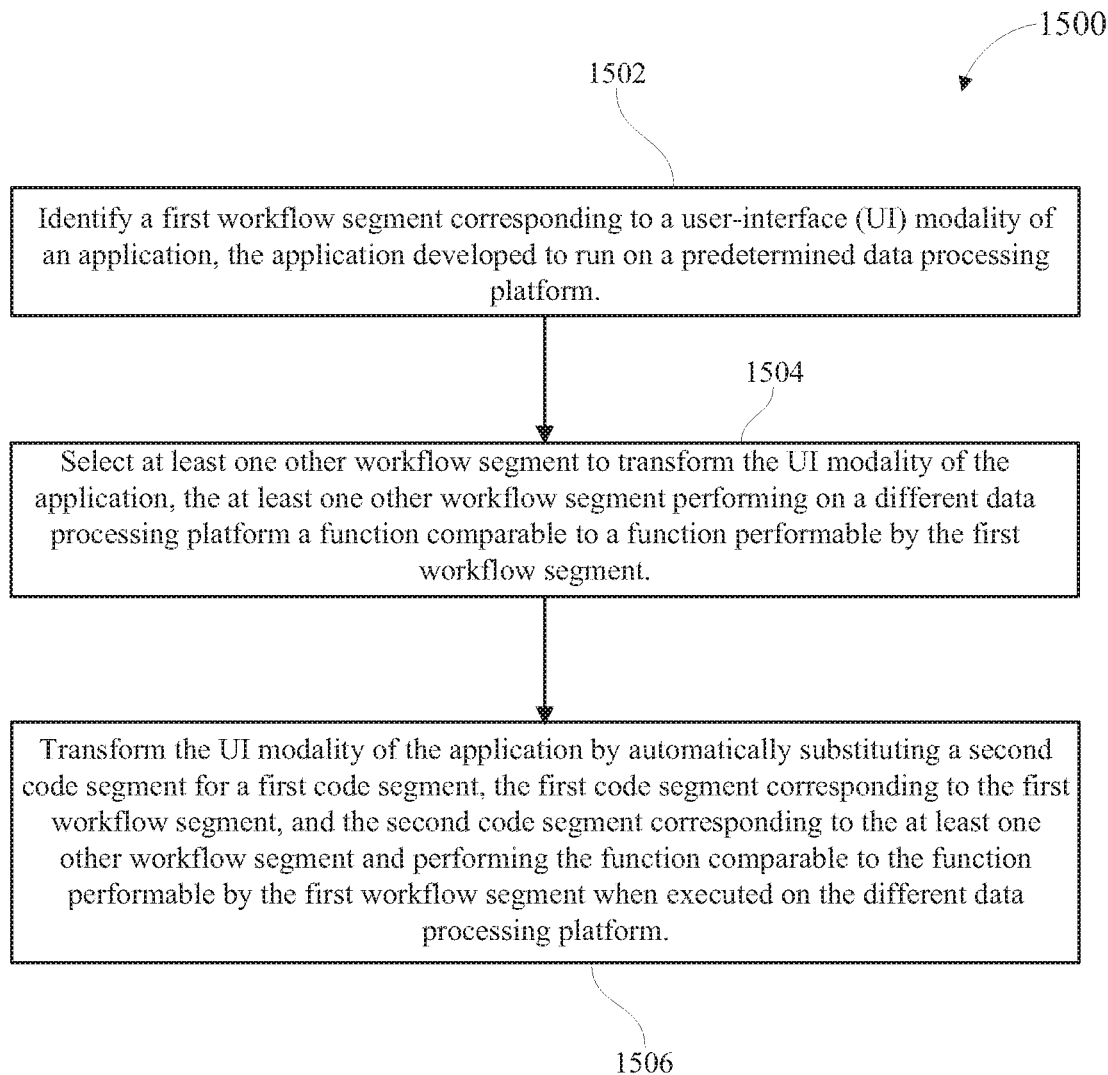
FIG. 15 is a flowchart of a method of automatically transforming user interface modalities of an application program according to an embodiment of the present invention.

FIG. 15 is a flowchart of a method 1500 of transforming platform-specific UI modalities of an application according to still another embodiment. Method 1500 can also be performed by a system the same or similar to the systems described in connection with FIGS. 1-12. The system at 1502 identifies a first workflow segment corresponding to a UI modality of an application, the application developed to run on a predetermined data processing platform. At 1504, the system selects at least one other workflow segment to transform the UI modality of the application, the at least one other workflow segment performing on a different data processing platform a function comparable to a function performable by the first workflow segment.

At 1506, the system transforms the UI modality of the application by automatically substituting a second code segment for a first code segment, the first code segment corresponding to the first workflow segment, and the second code segment corresponding to the at least one other workflow segment. The second code segment causes a data processing platform to perform a function comparable to the function performable by the first workflow segment when executed on the different data processing platform. In interacting with the different data processing platform, an application user interacts with application using a different UI modality than the modality used with the first code segment.

The system can utilize the original code of different applications from which the set of semantically similar workflow segments were drawn for the substitution of code segments.

The system, as described above, can collect and decompile an application's source code as part of the determination of the semantics of the application's workflow. The system also can generate object code compatible with different data processing platforms so that a function comparable to a function performed on one data processing platform is performed on a different platform using a different UI modality when the system-generated object code is executed by one or more processors of the different data processing platform.

The methods disclosed herein can be implemented in a computer program. The computer program product may include a computer readable storage medium (or media) having computer readable program instructions thereon for causing a processor to carry out aspects of the embodiments described herein.

The computer readable storage medium can be a tangible device that can retain and store instructions for use by any instruction execution device. The computer readable storage medium may be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions, as described herein, can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments described herein.

With respect to any aspects of the embodiments described herein with reference to flowchart illustrations and/or block diagrams of methods, apparatus (systems), and computer program products, it is to be understood that each such flowchart illustrations, block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the embodiments described herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1-15 are conceptual illustrations allowing for full explanation of the embodiments disclosed herein. The figures and examples disclosed are not meant to limit this disclosure to a single embodiment, as other embodiments are possible by way of interchange of some or all of the described or illustrated elements. Moreover, where certain elements can be partially or fully implemented using known components, only those portions of such known components that are necessary for an understanding of the disclosure are described, and detailed descriptions of other portions of such known components are omitted so as not to obscure any aspects of the embodiments disclosed. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the disclosure encompasses present and future known equivalents to the known components referred to herein by way of illustration.

The descriptions of the various embodiments have been presented only for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A method, comprising:
   identifying, with a data processing system, a first workflow segment corresponding to a user-interface (UI) modality of an application, wherein the application is developed to run on a predetermined data processing platform;
   selecting, with the data processing system, at least one other workflow segment to transform the UI modality of the application, wherein the at least one other workflow segment is configured to perform, when executed on a different predetermined data processing platform, a function comparable to a function performable by the first workflow segment; and
   transforming, using the selected at least one other workflow segment, the UI modality of the application to perform, when executed on the different predetermined data processing platform, the function comparable to the function performable by the first workflow segment;
   wherein the at least one other workflow segment is selected from a plurality of alternative workflow segments that are semantically similar to the first workflow segment, and wherein the selecting is based on classifying the first workflow segment with a classification model trained using machine learning to map workflow segments and corresponding UI modalities of the application to different predetermined data processing platforms.

2. The method of claim 1, further comprising generating a rank-ordered list of recommended workflow segments in response to selecting the at least one other workflow segment comprising a plurality of other workflow segments.

3. The method of claim 1, further comprising transforming the UI modality of the application by automatically substituting a second code segment for a first code segment, wherein the first code segment corresponds to the first workflow segment, and wherein the second code segment corresponds to the at least one other workflow segment and performs, when executed on the different predetermined data processing platform, the function comparable to the function performable by the first workflow segment.

4. The method of claim 1, further comprising predicting a domain of the application during an in-development phase using a prediction model trained with machine learning to predict the domain of the application based on a predetermined set of application features.

5. The method of claim 1, further comprising generating a training corpus for training the classification model by extracting workflow semantics and corresponding UI modalities of the application from each of a plurality of platform-specific versions of previously developed applications.

6. The method of claim 1, further comprising generating the plurality of alternative workflow segments by clustering semantically similar workflow segments with a classification model trained using machine learning to cluster the workflow segments based on a predetermined distance metric.

7. The method of claim 1, further comprising determining the corresponding UI modalities of the application based on accessibility text of the plurality of alternative workflow segments.

8. A system, comprising:
   computer hardware having at least one processor programmed to initiate executable operations, the executable operations including:
   identifying a first workflow segment corresponding to a user-interface (UI) modality of an application, wherein the application is developed to run on a predetermined data processing platform;
   selecting at least one other workflow segment to transform the UI modality of the application, wherein the at least one other workflow segment is configured to perform, when executed on a different predetermined data processing platform, a function comparable to a function performable by the first workflow segment; and
   transforming, using the selected at least one other workflow segment, the UI modality of the application to perform, when executed on the different predetermined data processing platform, the function comparable to the function performable by the first workflow segment;
   wherein the at least one other workflow segment is selected from a plurality of alternative workflow segments that are semantically similar to the first workflow segment, and wherein the selecting is based on classifying the first workflow segment with a classification model trained using machine learning to map workflow segments and corresponding UI modalities of the application to different predetermined data processing platforms.

9. The system of claim 8, wherein the executable operations further include generating a rank-ordered list of recommended workflow segments in response to selecting the at least one other workflow segment comprising a plurality of other workflow segments.

10. The system of claim 8, wherein the executable operations further include transforming the UI modality of the application by automatically substituting a second code segment for a first code segment, wherein the first code segment corresponds to the first workflow segment, and wherein the second code segment corresponds to the at least one other workflow segment and performs, when executed on the different predetermined data processing platform, the function comparable to the function performable by the first workflow segment.

11. The system of claim 8, wherein the executable operations further include predicting a domain of the application during an in-development phase using a prediction model trained with machine learning to predict the domain of the application based on a predetermined set of application features.

12. The system of claim 8, wherein the executable operations further include generating a training corpus for training the classification model by extracting workflow semantics and corresponding UI modalities of the application from each of a plurality of platform-specific versions of previously developed applications.

13. The system of claim 8, wherein the executable operations further include generating the plurality of alternative workflow segments by clustering semantically similar workflow segments with a classification model trained using machine learning to cluster the workflow segments based on a predetermined distance metric.

14. A computer program product, comprising:
   a computer readable storage medium having program code stored thereon, the program code executable by a computer to initiate operations including:
   identifying a first workflow segment corresponding to a user-interface (UI) modality of an application, wherein the application is developed to run on a predetermined data processing platform;
   selecting at least one other workflow segment to transform the UI modality of the application, wherein the at least one other workflow segment is configured to perform, when executed on a different predetermined data processing platform, a function comparable to a function performable by the first workflow segment; and
   transforming, using the selected at least one other workflow segment, the UI modality of the application to perform, when executed on the different predetermined data processing platform, the function comparable to the function performable by the first workflow segment;
   wherein the at least one other workflow segment is selected from a plurality of alternative workflow segments that are semantically similar to the first workflow segment, and wherein the selecting is based on classifying the first workflow segment with a classification model trained using machine learning to map workflow segments and corresponding UI modalities of the application to different predetermined data processing platforms.

15. The computer program product of claim 14, wherein the operations further include generating a rank-ordered list of recommended workflow segments in response to selecting the at least one other workflow segment comprising a plurality of other workflow segments.

16. The computer program product of claim 14, wherein the operations further include transforming the UI modality of the application by automatically substituting a second code segment for a first code segment, wherein the first code segment corresponds to the first workflow segment, and wherein the second code segment corresponds to the at least one other workflow segment and performs, when executed on the different predetermined data processing platform, the function comparable to the function performable by the first workflow segment.

17. The computer program product of claim 14, wherein the operations further include predicting a domain of the application during an in-development phase using a prediction model trained with machine learning to predict the domain of the application based on a predetermined set of application features.

18. The computer program product of claim 14, wherein the operations further include generating a training corpus for training the classification model by extracting workflow semantics and corresponding UI modalities of the application from each of a plurality of platform-specific versions of previously developed applications.

19. The computer program product of claim 14, wherein the operations further include generating the plurality of alternative workflow segments by clustering semantically similar workflow segments with a classification model trained using machine learning to cluster the workflow segments based on a predetermined distance metric.

20. The computer program product of claim 14, wherein the operations further include determining the corresponding UI modalities of the application based on accessibility text of the plurality of alternative workflow segments.

\* \* \* \* \*